United States Patent
Russo et al.

(10) Patent No.: US 12,212,605 B2
(45) Date of Patent: Jan. 28, 2025

(54) CLOUD CONTROL MANAGEMENT SYSTEM INCLUDING A DISTRIBUTED SYSTEM FOR TRACKING DEVELOPMENT WORKFLOW

(71) Applicant: Capital One Services, LLC, McLean, VA (US)

(72) Inventors: Scott Russo, Midlothian, VA (US); Anthony Nelson, Herndon, VA (US); Shashi Chappidi, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 152 days.

(21) Appl. No.: 17/742,187

(22) Filed: May 11, 2022

(65) Prior Publication Data
US 2023/0370497 A1    Nov. 16, 2023

(51) Int. Cl.
| H04L 29/06 | (2006.01) |
| H04L 9/40 | (2022.01) |
| H04L 29/08 | (2006.01) |
| H04L 47/762 | (2022.01) |
| H04L 47/78 | (2022.01) |
| H04L 12/26 | (2006.01) |

(52) U.S. Cl.
CPC ............ *H04L 63/20* (2013.01); *H04L 47/762* (2013.01); *H04L 47/781* (2013.01); *H04L 63/104* (2013.01)

(58) Field of Classification Search
CPC ..... H04L 63/20; H04L 47/762; H04L 47/781; H04L 63/104
USPC .......................................................... 726/1
See application file for complete search history.

(56) References Cited

U.S. PATENT DOCUMENTS

| 9,832,205 | B2* | 11/2017 | Santhi | G06F 8/60 |
| 10,956,868 | B1* | 3/2021 | Cronan | G06Q 10/105 |
| 11,140,240 | B1* | 10/2021 | Brown | G06F 9/547 |
| 11,520,907 | B1* | 12/2022 | Borowiec | G06F 3/067 |
| 2015/0237071 | A1* | 8/2015 | Maher | H04W 12/04 726/1 |
| 2018/0124195 | A1* | 5/2018 | Bell | H04W 4/185 |
| 2019/0007415 | A1* | 1/2019 | Kliger | H04L 63/104 |
| 2019/0082004 | A1* | 3/2019 | Bosch | H04L 67/10 |
| 2020/0050494 | A1* | 2/2020 | Bartfai-Walcott | G06F 9/5083 |
| 2020/0412625 | A1* | 12/2020 | Bagarolo | H04L 43/0805 |
| 2022/0004645 | A1* | 1/2022 | Agarwwal | H04L 63/20 |

(Continued)

FOREIGN PATENT DOCUMENTS

| TW | 201413644 A | * | 4/2014 | |
| WO | WO-2019199495 A1 | * | 10/2019 | G06F 16/9035 |
| WO | WO-2019229031 A1 | * | 12/2019 | H04L 63/10 |

*Primary Examiner* — Haresh N Patel
(74) *Attorney, Agent, or Firm* — Sterne, Kessler, Goldstein & Fox P.L.L.C.

(57) ABSTRACT

Disclosed herein are system, method, and computer program product embodiments for managing and tracking the deployment of a cloud control within a cloud network where creation of the cloud control may be distributed between different user devices in the cloud network. A cloud control is implemented using a control policy which is composed of one or more components that provide functions for executing a functionality of the cloud control. A component workflow manager delegates control of the one or more components to different user devices and tracks the development workflow of the components as they progress through workflow states until they are ready for deployment within the cloud network.

15 Claims, 5 Drawing Sheets

(56) References Cited

U.S. PATENT DOCUMENTS

2023/0078518 A1* 3/2023 Huard ................. G06F 9/45558
709/224
2023/0342188 A1* 10/2023 Dunn .................... G06F 9/4831

* cited by examiner

CLOUD CONTROL MANAGEMENT SYSTEM INCLUDING A DISTRIBUTED SYSTEM FOR TRACKING DEVELOPMENT WORKFLOW

TECHNICAL FIELD

Embodiments relate to cloud computing, specifically a system for implementing document modularization to improve cloud control management in a cloud-based computing environment.

BACKGROUND

Cloud controls are security practices that are implemented to secure cloud-based computing environments. Cloud controls may impose restrictions on actions that can be performed within these environments. As one example, a cloud control may specify that a certain resource is not to be publically accessible outside of the environment. There is typically a one-to-one relationship between a cloud control and a security restriction imposed within the environment.

There are a number of different security domains for cloud-based computing environments including application and interface security (AIS), audit assurance and compliance (AAC), business continuity/operation resilience, data security, encryption and key management, identity and access management, and virtualization, just to name a few examples. Cloud controls may be implemented in each of these domains. As cloud-based computing environments grow and become more complex, the number of cloud controls to be implemented for securing those environments increases to maintain the desired level of security.

The increase in the number of cloud controls presents two distinct challenges to an organization running a cloud-computing environment in deploying cloud controls. First, the creation of cloud controls is a multi-step process that requires review at every step to ensure that the cloud controls are built properly to guarantee cloud resources comply with security requirements of the cloud-computing environment. So as the number of controls increases, the ability to track the development of each control becomes more challenging. Current systems rely on manual tracking for tracking the lifecycle of the cloud control and unstructured control policy for defining the functions of the cloud control. These methods do not scale well. Second, cloud controls are subject to continual changes, such as modification of existing features or addition of new features, as new cloud services or security risks arise. In large organizations with multiple teams, those different teams typically implement these changes to a cloud control. Current methods of tracking cloud controls make it difficult to synchronize the changes or requests from each of those teams in a manner that ensures the cloud control is able to enforce compliance of cloud resources with the security requirements of the organization.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

A centralized mechanism according to embodiments disclosed herein solves these challenges associated with tracking cloud controls through their lifecycle—from authoring to reviewing to deployment. In some embodiments, the centralized mechanism operates in a cloud network where there may be hundreds or thousands of cloud controls in various states of that lifecycle, e.g., cloud controls that have been deployed, cloud controls that are being authored, cloud controls that are being reviewed and approved. The number of cloud controls within a cloud network compounds the issues of tracking these controls within the cloud network. Cloud controls may overlap or even conflict in terms of the security requirements for a particular resource. For example, a cloud control may manage access to particular resources within a cloud network. The features described in this disclosure provide an improved system for tracking and managing cloud controls through their development and deployment cycle. The technical improvements to a cloud control system include increased control over the development of a cloud control, better visibility in the deployment cycle of the control as it progresses from drafting to deployment stages, and increased efficiency in creating controls using common metadata and reusable control components.

Provided herein are system, apparatus, device, method and/or computer program product embodiments, and/or combinations and sub-combinations thereof, for tracking deployment of one or more cloud controls in a cloud network. Each cloud control may enforce one or more security requirements for one or more cloud resources in the cloud network and may be implemented as a protocol or policy within the network. Examples of cloud controls include digital security policies involving usernames and passwords, use of two-factor authentication for signing in and resource security policies involving managing access to specific resources and specifying that certain software functions are not publically accessible to devices outside of the cloud environment. Other non-limiting examples of cloud controls include encryption functions, backup functions, and network configuration of the cloud environment.

Cloud control policies may be defined by a number of components that dictate how they are to be implemented within the cloud environment. A control policy may be installed in a cloud network to provide a particular functionality to the network, such as access control, resource provisioning, security, etc. The functionality of the control policy may be divided into multiple functions with each function carried out by a respective component. In some embodiments, components may be implemented as a software object. Collectively, these components may be combined into a single control policy that executes in accordance with the control policy. A respective component in a policy may be configured to implement a particular function of the control policy. This function may define a functionality (e.g., a restriction or permission) associated with the cloud control. For example, a cloud control for preventing a category of resources from being made publically available may include a component identifying resources that are covered by the control and another component identifying how the restriction is to be enforced (e.g., preemptively by inspecting resources at a predetermined schedule or at run-time).

Further non-limiting examples of components include an enforcement component, a resource component, a compliance component, a dependency component, and a remediation component. For example, a cloud control that specifies accessibility restrictions on a particular cloud resource may be defined by a number of components including a resource component identifying the cloud resource, an accessibility component identifying the particular accessibility restrictions to be associated with the software interface, a category component for the category of the control (e.g., digital security, encryption, backup, resource security), an enforcement component identifying how the control is to be enforced within the environment, a compliance component identifying when a resource is compliant with the cloud control, a dependency component identifying other cloud controls that may overlap or even conflict with the security restrictions imposed by the cloud control, and a remediation component identifying actions to be performed when a resource is determined to be non-compliant.

In some embodiments, these components may be stored separately in a database and then compiled into their respective components. The compiled components may then be compiled to form a control policy. A non-limiting example of a control policy is a document such as a technical specification that includes all components needed to implement the corresponding cloud control. This hierarchical structure for the policy—formed from separate components—enables a number of advantages. Components may be developed separately and may be completed at different times; the system provides increased control and visibility of the development of the cloud control's policy by allowing each respective component to be tracked and monitored. In other words, the development status of a policy may be tracked via the development of its respective components. Modularizing the policy into respective components also brings increased efficiency in creating controls because responsibility and control over each component may be delegated for drafting in a parallel manner. Components for the policy may therefore be developed concurrently, thereby decreasing the development time for the policy.

Figure 1:
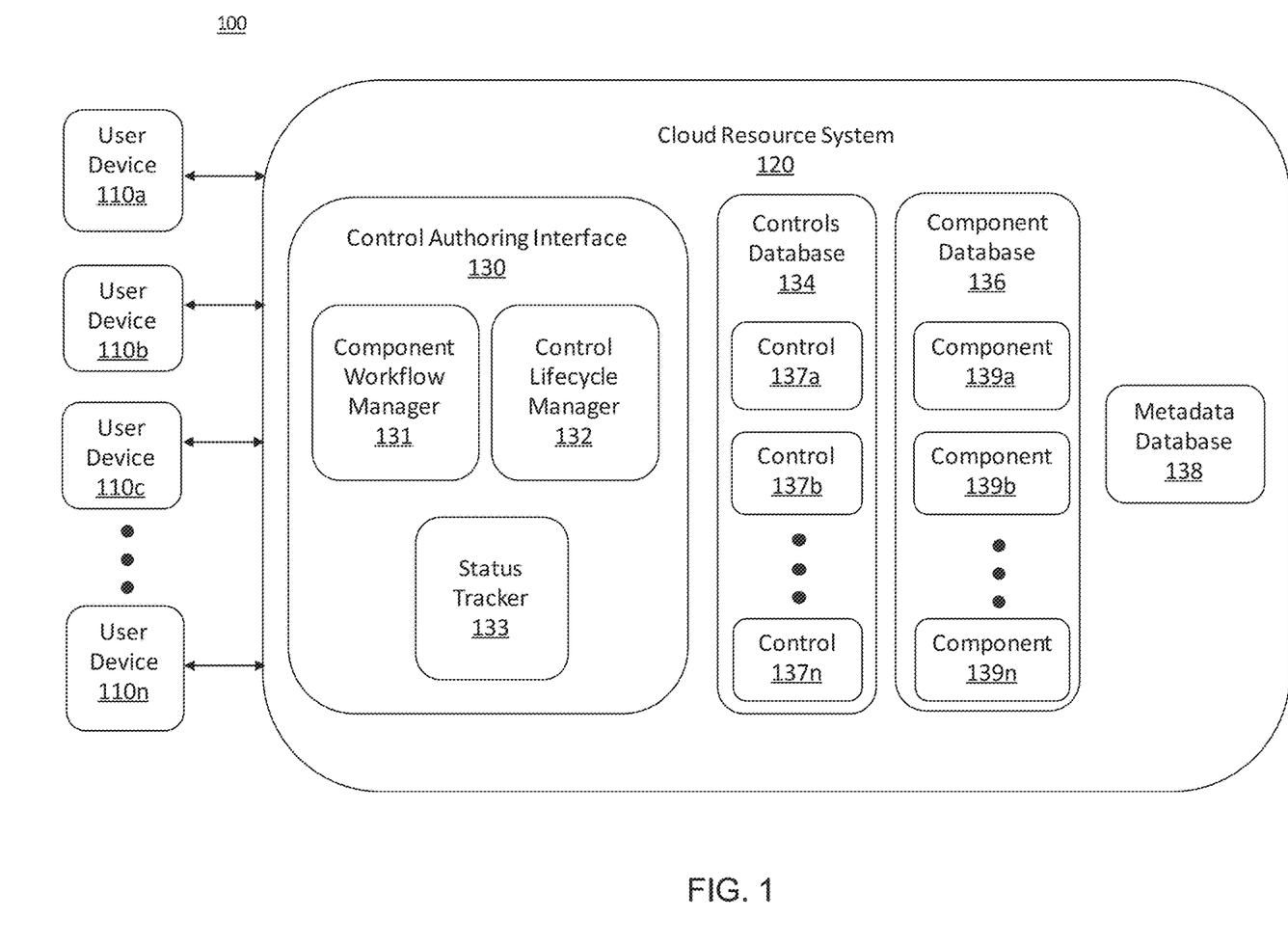
FIG. 1 is a block diagram of a cloud network environment for managing control policy workflow, according to some embodiments.

FIG. 1 is a block diagram of a cloud network environment 100 for managing a control policy workflow, according to some embodiments. Cloud network environment 100 may include user devices 110*a-n* and a cloud resource system 120.

User devices 110*a-n* may be any device with privileges to access resources within the cloud network environment 100. User devices 110*a-n* may represent any number of user devices within cloud network environment 100 and may be organized into various groups, with each group having distinct access privileges to the resources.

Cloud resource system 120 may include a number of components for enabling the centralized management and deployment of cloud controls within a cloud environment. Examples of these components include a control authoring interface 130, a controls database 134, a component database 136, and a metadata database 138.

An advantage of the cloud resource system 120 includes the distributed creation of and tracking of control policies across a cloud environment that may deploy hundreds or thousands of control policies that may be authored by a number of different user devices within the cloud environment. Additionally, control policies may be created in a consistent manner, and each policy may be tracked throughout its lifecycle and deployed in an automated manner when the system determines that the policy is ready. This advantage is realized through the control authoring interface 130 that implements a hierarchical structure for the control policy using components and predefined metadata. The control policy is composed of one or more components and each component is composed of a group of predefined metadata. Components of the control policy allow different pieces of the control policy to be distributed to different authoring user devices within the cloud network. Predefined metadata, which are used to construct components, allow the components to be created across different user devices in a consistent manner, which enables cloud authoring interface 130 to more easily track and manage hundreds or thousands of cloud policies through various states of their lifecycle (e.g., drafting, review, deployment).

Control authoring interface 130 includes component workflow manager 131, control lifecycle manager 132, and status tracker 133. Control authoring interface 130 may associate the necessary components needed for implementing a cloud control. For example, control authoring interface 130 may receive a request, e.g., from one of user devices 110*a-n*, to deploy a cloud control that specifies a particular functionality, e.g., imposing public access conditions on a particular resource, within the cloud network. After receiving the request, control authoring interface 130 determines the components needed to implement the requested cloud control in the cloud network and associate those components with the cloud control. Collectively, these components will form a control policy that represents the executable instructions that are deployed within the cloud network for carrying out the specified functionality.

Accordingly, a control policy associated with a cloud control may be constructed from components that execute the necessary functions to realize the specified functionality of the cloud control. In other words, components of the control policy may provide the one or more functions to carry out the functionality of the cloud control. For example, the control policy may include a number of components that are each responsible for a particular function for implementing the specified functionality of imposing access conditions on a resource within the cloud network. The components in a control policy may include a component that is configured to implement a particular function (e.g., enforcement, compliance, execution).

In associating components with a control policy, control authoring interface 130 may select components to be included in the control policy that are needed for providing the functions to realize the desired functionality of the cloud control. In some embodiments, the cloud control may enforce one or more security requirements on one or more cloud resources in the cloud network and the functionality provided by the cloud control comprises a security action defining permissible or forbidden actions associated with a resource in the cloud network, such as imposing access conditions on the resource. Components in a control policy provide specific functions that collectively implement the specified functionality.

After selecting and associating the components with the control policy, component workflow manager 131 manages components through their respective workflow as they are created, reviewed, approved, and prepared for implementation within the control policy. Component workflow manager 131 may first delegate control of each component to a user device within the cloud network. The user device becomes responsible for creating and managing the component before it is implemented within the control policy.

In some embodiments, component workflow manager 131 may delegate control of each component to a group of user devices such as a particular team within the cloud environment. Delegating control of a component may include granting a privilege to modify the component and prevent other user devices that were not delegated control from modifying the component. Modifying a component may include authoring the component or otherwise being able to make modifications to the component. Other examples of privileges include a review privilege for reviewing the component and an approval privilege for approving the component. Approving a component may be required to transition the component between the different development workflow states. Components go through a development workflow that may include various workflow states. Delegating control to the one or more user devices may also automatically trigger a status tracker 133 for tracking these states of the component after delegation has occurred. Examples of states include a drafting state, an approved state, a ready state, an operational state, a deactivation state, and a retired state, just to name a few examples.

States may refer to the progress in creating the components and ultimately deploying the associated control policy when each component is ready. The description of the states is purely exemplary and is not limited to the particular states described in the following embodiments.

A drafting state may refer to when the component is being created by the respective user device delegated control over that component. In some embodiments, creating the component may include writing the code for executing the function for that component and defining the properties of the component based on predefined metadata. Properties of the component include the relevant resources to be controlled by the control policy, enforcement type, compliance conditions for the resources based on the functionality of the control policy, and notification conditions for how to handle non-compliance. Approval may be required to progress the component through the developmental workflow such as from a drafting state to a review state. Accordingly, for components that require such approval, component workflow manager 131 may be delegated control in the form of both an authoring privilege to user devices responsible for generating the component and an approval privilege to user devices responsible for approving the component and transitioning the component through the different development workflow states until the control policy is deployed. In this manner, different privileges may be delegated for the same component such as an administrator user device being delegated the approval privilege for approving the component and team user devices being delegated the authoring privilege.

After delegating control, component workflow manager 131 may receive or retrieve updates from user devices throughout the workflow of the component and maintain a current state for each component. In some embodiments, triggering the status tracker 133 may cause component workflow manager 131 to intermittently detect the states in the development workflow of the component. Status tracker 133 may detect the states of each component based on updates from the respective user device. These updates may occur manually such as via receiving updates from the user device or devices delegated control over the component or automatically (i.e., without requiring user action) by monitoring the development of the component. Automatic monitoring may be based on determining the progress of completion such as through how many properties have been completed by the user device and whether a computer program has been completed and checked into the database (e.g., component database 136).

In some embodiments, to enable automatic monitoring, delegating control to the one or more user devices may also include causing status tracker 133 to intermittently automatically establish a feedback link between the one or more user devices and the control authorizing interface 130. The feedback link may be used by the control authoring interface 130 to retrieve status updates about the delegated component as it is being constructed by the user device.

Control lifecycle manager 132 manages the lifecycle of a control policy through its respective lifecycle as components are created, reviewed, approved, and prepared for implementation within the control policy. Control lifecycle manager 132 may update a lifecycle state associated with the control policy responsive to the states of components that make up the control policy. That is, the lifecycle state of a control policy is based on the development states of its respective components. Status tracker 133 may be configured to track the lifecycle state of the control policy and relay the lifecycle state to control lifecycle manager 132. Control lifecycle manager 132 may lock, or prevent, deployment of the control policy until the status tracker 133 provides a particular lifecycle state. This feature prevents the control policy from being deployed prematurely before the components of the control policy have been approved for deployment.

In some embodiments, control lifecycle manager 132 may update the lifecycle state in a centralized database, such as controls database 134. Control lifecycle manager 132 may utilize lifecycle states to manage when controls are deployed within the cloud network. For example, lifecycle states may refer to the progress of the control policy for deployment within the control network. In some embodiments, there may be a lifecycle state indicating that the control policy is in an initiated state, a drafting state, an approved state, and a deployed (operational) state. Lifecycle states for the control policy may be used to track the development of the control policy and for ensuring that the control policy is not deployed until all components that form the control policy are ready.

Controls database 134 may store the controls for the cloud network. Controls may include any number of controls such as controls 137*a-n*. Controls database 134 may store all control policies of the cloud network throughout their lifecycle including controls that have yet to be deployed, controls that have already been deployed, and retired controls.

Component database 136 may store the components for the cloud controls in the cloud network. Components may include any number of components such as components 139*a-n*. Component database 136 may store all components of the cloud network throughout their workflow. Components may be reused for different controls as well as for updating existing controls. For example, when there is an overlap in functions between controls, component workflow manager 131 may determine that an existing component in component database 136 may be reused for another control policy. In this manner, cloud controls may be created in a modular manner that reinforces the distributed capability of the cloud resource system 120 to create and deploy cloud controls within a cloud network.

Metadata database 138 may store predefined metadata that may be utilized to create the components. Control authoring interface 130 may provide predefined metadata as options for the properties of the components. Utilization of predefined metadata allows each component and, by extension, the control policy to be standardized and consistent with each other in terms of how each component is constructed. This standardization provides advantages within a cloud network when there are hundreds and thousands of cloud controls and user devices that may be responsible for creating the cloud controls. As one example of predefined metadata, an enforcement type may specify automated enforcement (e.g., via a computer program that automatically detects compliance conditions associated with the control policy), manual enforcement (e.g., via a user device for manually detecting compliance conditions associated with the control policy), or a hybrid mechanism. Automated, manual, and hybrid enforcement are examples of predefined metadata for the enforcement type (i.e., property of the component). Accordingly, the enforcement type may be standardized and consistent for each control policy to be implemented in cloud resource system 120. Predefined metadata for properties may be stored in metadata database 138. User devices 110*a-n* may retrieve the predefined metadata when creating the components based on the properties of the components. In some embodiments, the metadata may be provided in the form of a drop-down list that reinforces that standardization of the creation of the components.

Figure 2:
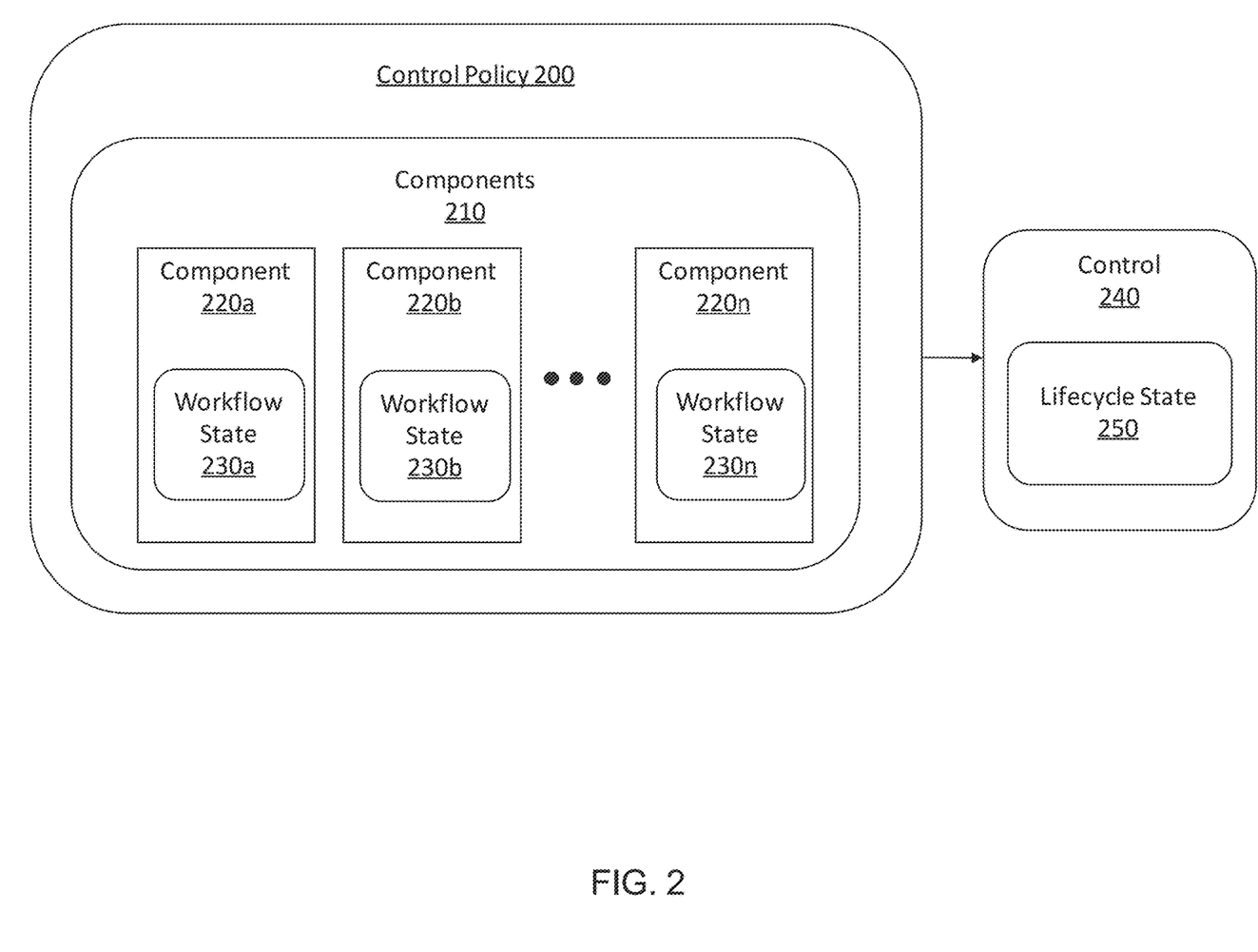
FIG. 2 is a block diagram of an improved control policy, according to some embodiments.

FIG. 2 is a block diagram of a cloud control policy 200, according to some embodiments. Cloud control policy 200 may include component section 210 and may be used to implement a cloud control 240.

Component section 210 may include any number of components such as component 220*a*, component 220*b*, and component 220*n*. Components may store data regarding their respective workflow states. For example, component 220*a* may store workflow state 230*a*, component 220*b* may store workflow state 230*b*, and component 220*n* may store workflow state 230*n*.

Once deployed, cloud control policy 200 carries out the functionality, or intent, of cloud control 240, which may include a lifecycle state 250. Similar to the workflow state of a component, lifecycle state 250 tracks the various states of a cloud control policy as it is being created and deployed within the cloud network. Examples of lifecycle states include an initiated state, a drafting state, an approved state, a deployed (operational) state, and a retired state.

The lifecycle state of a control policy may be directly related to the workflow states of its respective components. The following describes exemplary lifecycle states but the disclosure is not limited to states described herein. The initiated state may refer to the starting phase of a control policy after the functionality (intent) of the control policy has been defined but before any components for the control policy have been defined. Control lifecycle manager 132 may assign privileges to user devices for managing the control policy including a privilege for adding new components to the control policy. The drafting state may refer to a state of the control policy when at least one of its components is still being drafted (i.e., in a drafting state within the component development workflow) and until all of the components of the control policy have completed the drafting state and are ready to undergo a review and editing process. The approved state may refer to a state of the control policy where the components may still undergo review and approval by user devices in the cloud network. Components in this state of the component development workflow may be undergoing a quality control review where edits and changes to the component may still be revised. Once all of the components of a control policy have been approved and are ready for implementation, the lifecycle state for the control policy may transition to an approved state where the control policy may then be deployed in the cloud network. The retired state may indicate that the control policy is no longer deployed and enforced within the cloud network.

Accordingly, in updating the lifecycle state associated with the control policy, control lifecycle manager 132 may determine the workflow states of the components that form the control policy. For example, if the control policy is composed of a first and second component, control lifecycle manager 132 may determine the workflow state of the first component and a second workflow state associated with a second component in determining the lifecycle state for the control policy.

Figure 3:
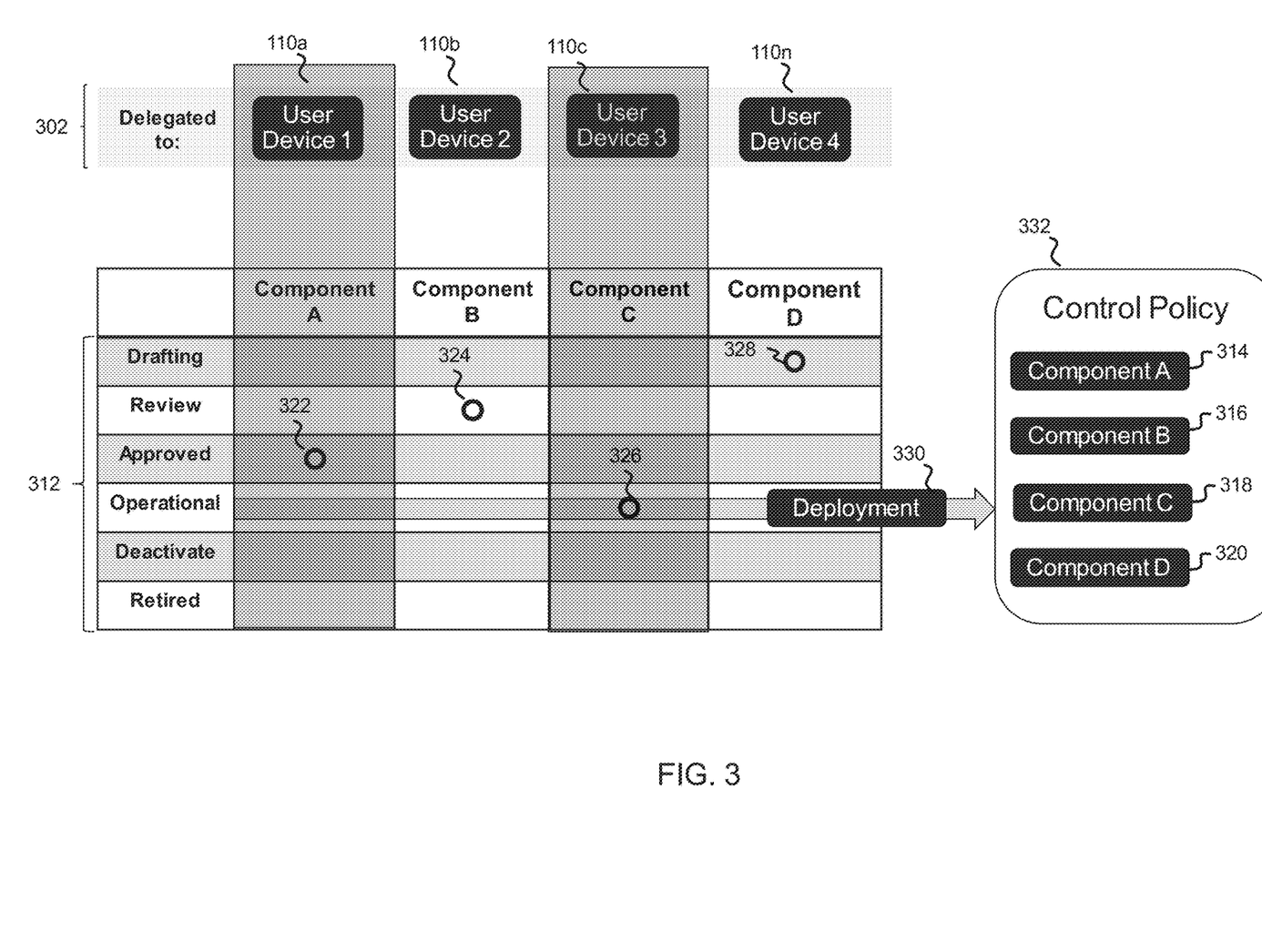
FIG. 3 is a graph illustrating lifecycle states of various components of a control policy, according to some embodiments.

FIG. 3 is a graph illustrating workflow states 312 of various components of a control policy, according to some embodiments. The workflow states 312 depicted in FIG. 3 are purely exemplary.

A control policy 332 may be composed of multiple components such as component A 314, component B 316, component C 318, and component D 320. Component workflow manager 131 may delegate control 302 of each component of control policy 332 to one or more user devices 110*a-n*. For example, component workflow manager 131 may delegate control of component A 314, component B 316, component C 318, and component D 320. As noted above, each component of control policy 332 may provide different aspects of the overall functionality of the control policy 332. For example, in some embodiments, component A 314 may be implemented as an enforcement component, component B 316 may be implemented as a compliance component, component C 318 may be implemented as a dependency component, and component D 320 may be implemented as a remediation component.

In some embodiments, an enforcement component may provide functions associated with identifying how the cloud control is to be enforced within the environment. For example, an enforcement component may indicate automatic or manual enforcement and if automatic, may further specify the software program that executes to traverse the cloud network to identify resources impacted by the cloud control. A compliance component may provide functions associated with the compliance conditions for when a resource is compliant with the cloud control. A dependency component may provide functions for identifying other cloud controls that may overlap or even conflict with the security restrictions imposed by the cloud control. A dependency component may further include actions that may be performed when conflicting cloud controls are identified. A remediation component may provide functions for identifying actions to be performed when a resource is determined to be non-compliant.

User devices 110*a-n* may provide updates to component workflow manager 131 regarding the current workflow state of their respective components. For example, user device 110*a* may update the state 322 of enforcement component 314 as being in the approved state that indicates that the component has completed review and is pending final approval by user device 110*a*. Similarly, user device 110*b* may update the state 324 of compliance component 316 as being in the reviewed state. User device 110*c* may update the state 326 of dependency component 318 as being in the operational state 326. In addition, user device 110n may update the state 328 of remediation component 320 as being in the drafting state 328. These states are purely exemplary and are not intended to be limiting. The purpose of the states is meant to indicate the progress of respective components through their workflow. In some embodiments, the present disclosure provides the benefit of improved efficiency in deploying control policies in a cloud network by distributing the workflow of each component across multiple user devices in cloud networks. Moreover, the use of the states to track and manage the deployment of the components within the control policy 332 prevents premature deployment of control policies within the cloud network.

Component workflow manager 131 determines when all components of a control policy are all updated to the workflow state that is identified as being ready for deployment within the control policy 332. In some embodiments, when components are updated as being in the operational state, component workflow manager 131 may deploy the components within control policy 332, which, in turn, updates the lifecycle state of the control policy 332 as being ready for deployment 330 within the cloud network.

Figure 4:
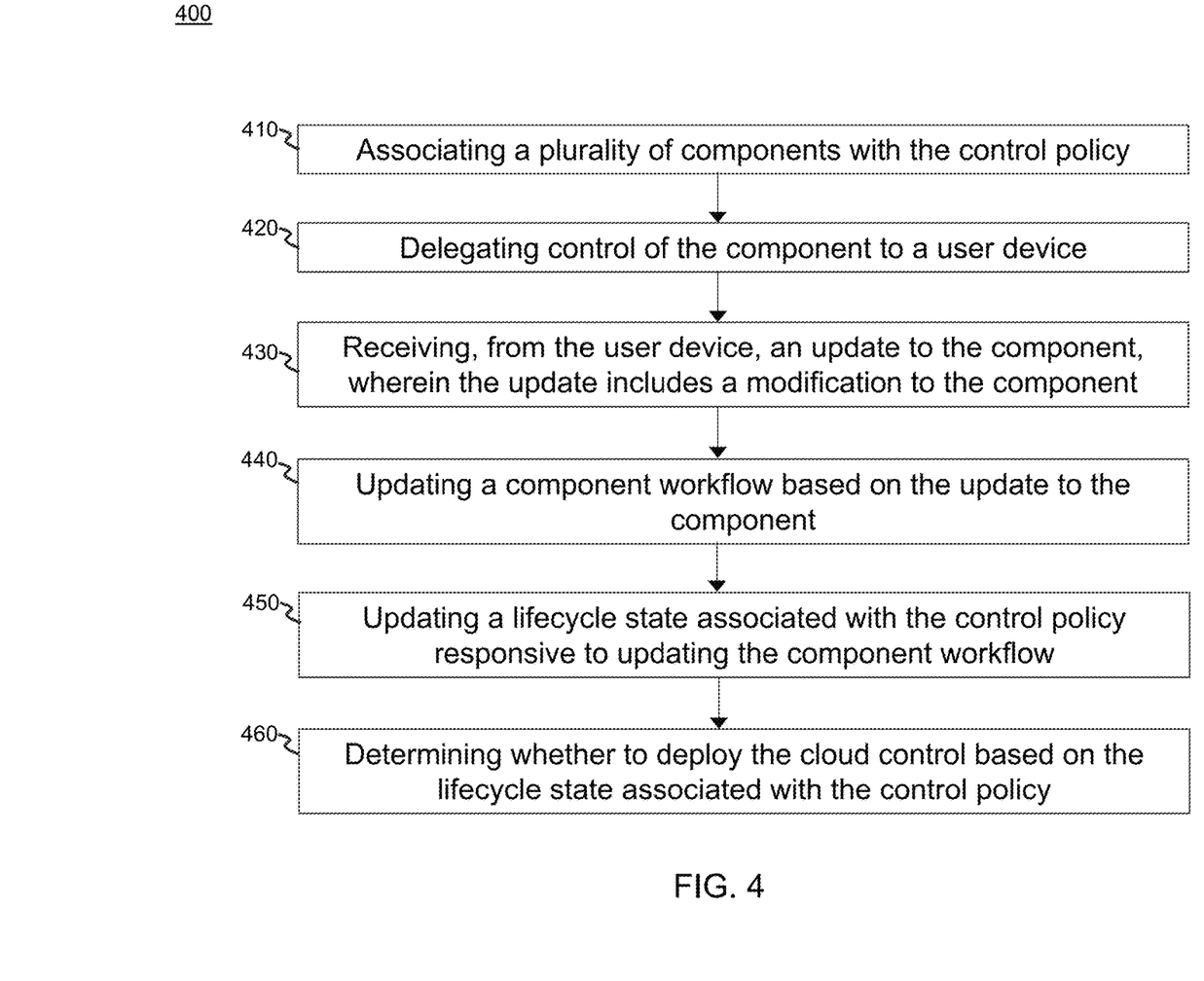
FIG. 4 is a flowchart illustrating deployment of a cloud control based on lifecycle states of a control policy, according to some embodiments.

FIG. 4 is a method 400 illustrating deployment of a cloud control based on lifecycle states of a technical specification, according to some embodiments. As a non-limiting example with regards to FIGS. 1-3, one or more processes described with respect to FIG. 4 may be performed by a cloud resource system (e.g., cloud resource system 120 of FIG. 1) for generating a cloud control based on a technical specification. In such an embodiment, cloud network 130 may execute code in memory to perform certain steps of method 400. While method 400 of FIG. 4 will be discussed below as being performed by control authoring interface 130, other devices may store the code and therefore may execute method 400 by directly executing the code. Accordingly, the following discussion of method 400 will refer to devices of FIG. 1 as an exemplary non-limiting embodiment of method 400. Moreover, method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 410, component workflow manager 131 may associate components with a control policy that represents an implementation of a desired cloud control within a cloud network. The control policy may include a number of functions to carry out different portions of the functionality (or intent) of the desired cloud control. As a non-limiting example, the functionality of a desired cloud control may be a security control specifying that a particular category of resources in the cloud network should be prevented from being made publically accessible to devices outside of the cloud network. Implementing this functionality in the cloud network may require a combination of a number of different functions such as specifying the category of resources or the resources themselves, an enforcement function to enforce the policy on resources in the cloud network, a compliance function to determine whether a particular resource is in compliance with the enforced policy, an execution function such as a software module that includes a template for code that, when executed, initiates the cloud control, just to name a few examples. These functions represent different portions of the desired functionality (intent) of the cloud control.

In 420, component workflow manager 131 may then delegate control of each component associated with the control policy. For example, the control policy may include a first and second component that implement a first and second function, respectively, of the control policy. The first function of the control policy may define a first portion of the functionality provided by the cloud control while the second function of the control policy may define a second portion of the functionality. For example, the first portion of the functionality of the cloud control may include the enforcement functions for identifying the affected resources within the cloud network and then imposing the access conditions on the identified resources. The second portion of the functionality may include compliance conditions for determining when resources in the cloud network are compliant with the functionality (e.g., when resources are compliant with the access conditions specified by the security action of the first component). Component workflow manager 131 may then delegate control of the second component to a user device, which may be the same user device that was delegated control over the first component or another user device. Control over the second component may involve the same assigning of privileges over the component such as a modification privilege, an authoring privilege, and an approval privilege.

In 430, component workflow manager 131 may receive an update for the component. In some embodiments, the update indicates a current state of the component such as a modification to the component. The update may be received from the user device that was delegated control, such as an authoring privilege, over the component. In some embodiments, component workflow manager 131 may confirm that the user device that transmitted the update to the component is linked to the authoring privilege before accepting the update to the component.

In 440, component workflow manager 131 may update a component workflow in response to receiving the update about the component. In some embodiments, updating the component workflow may include updating the developmental state of the component within a centralized database, such as component database 138.

In 450, control lifecycle manager 132 may update a lifecycle state associated with the control policy responsive to updating the component workflow. The lifecycle state of a control policy is based on the development states of its respective components. Status tracker 133 may be configured to track the lifecycle state of the control policy and relay the lifecycle state to control lifecycle manager 132. Control lifecycle manager 132 may lock, or prevent, deployment of the control policy until the status tracker 133 provides a particular lifecycle state. This feature prevents the control policy from being deployed prematurely before the components of the control policy have been approved for deployment.

In 460, control lifecycle manager 132 may determine whether to deploy the cloud control based on the lifecycle state associated with the control policy. When control lifecycle manager 132 determines that the control policy is in the lifecycle state, that indicates that all of the components of the control policy have been drafted, reviewed, approved, and are ready to be implemented, control lifecycle manager 132 may then determine that the control policy is ready to be deployed within the cloud network. Component workflow manager 131 may then deploy the control policy in the cloud network.

Figure 5:
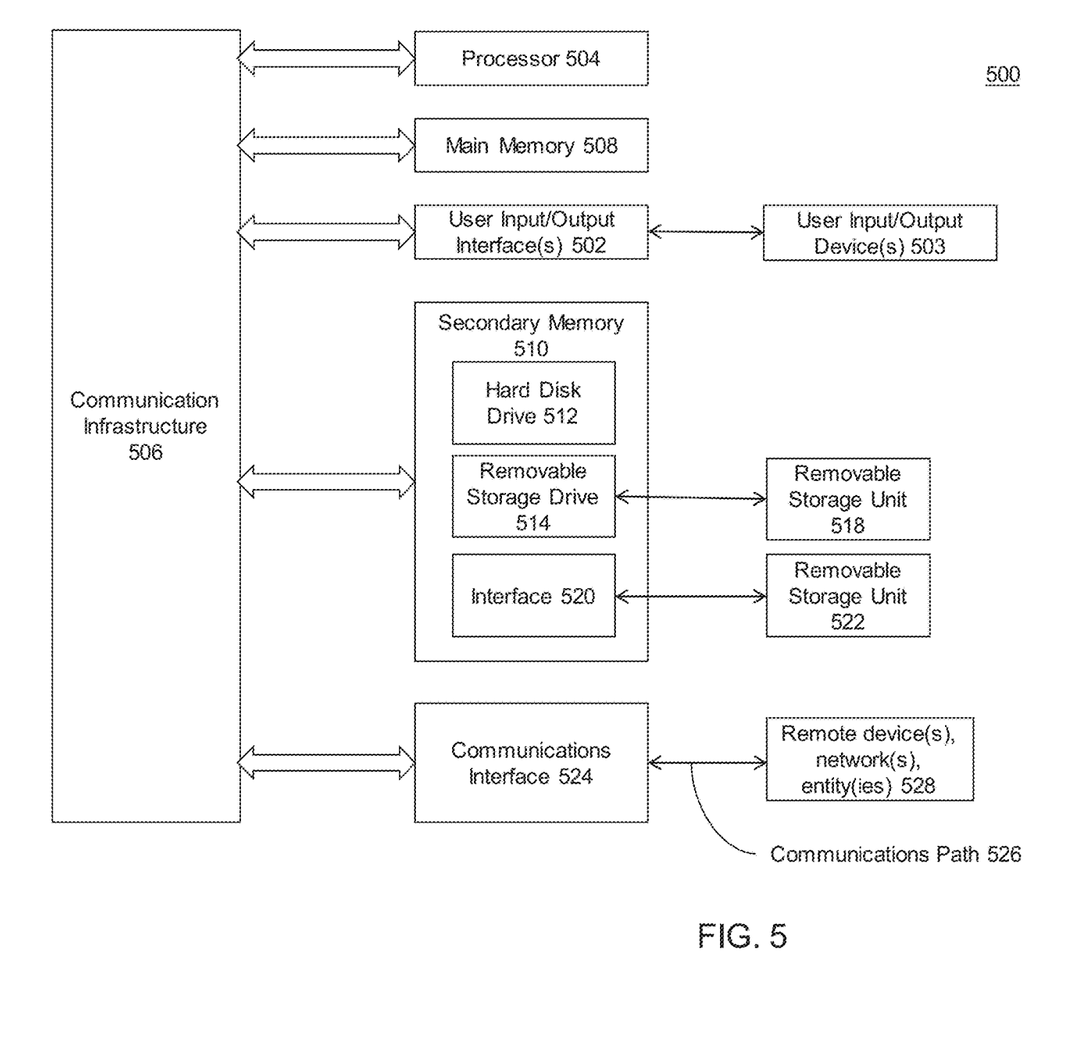
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other yet still co-operate or interact with each other.

The breadth and scope of this disclosure should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for tracking deployment of a cloud control in a cloud network, wherein the cloud control is defined by a control policy, the method comprising:

associating a plurality of components with the control policy, wherein the plurality of components includes a first component that is configured to implement a first function of the control policy and a second component that implements a second function of the control policy, and wherein the first function of the control policy defines a first portion of a functionality provided by the cloud control and the second function of the control policy defines a second portion of the functionality provided by the cloud control;

delegating control of the first component to a user device, wherein the control of the first component includes a privilege for modifying the first component;

receiving, from the user device, an update to the first component, wherein the update includes a modification to the first component;

updating a workflow state associated with the first component responsive to receiving the update to the first component;

receiving, from a second user device, a second update to the second component, wherein the second update includes a modification to the second component;

updating a second workflow state associated with the second component responsive to receiving the update to the second component;

updating a lifecycle state associated with the control policy responsive to the modification to the first component and the modification to the second component; and deploying the cloud control based on the lifecycle state associated with the control policy.

2. The computer-implemented method of claim 1, wherein the cloud control enforces a security requirement on a resource in the cloud network and the functionality provided by the cloud control comprises a security action associated with the resource in the cloud network.

3. The computer-implemented method of claim 1, wherein the privilege includes one of an authoring privilege for authoring the first component, a review privilege for reviewing the first component, or an approval privilege for approving the first component.

4. The computer-implemented method of claim 1, wherein the workflow state and the second workflow state comprise a plurality of states associated with implementing the first component in the control policy including a first state indicating that the first component is being authored, a second state indicating the first component is undergoing review, or a third state indicating that the first component is ready to be implemented in the control policy.

5. The computer-implemented method of claim 1, wherein updating the lifecycle state associated with the control policy is based on the workflow state associated with the first component and the second workflow state associated with the second component.

6. The computer-implemented method of claim 1, further comprising:

delegating control of the second component to a second user device, wherein the control of the second component includes a second privilege for modifying the second component.

7. A cloud controls implementation system comprising:
   a memory;
   a processor connected to the memory and configured to:
      associate a plurality of components with a control policy, wherein the plurality of components includes a first component that is configured to implement a first function of the control policy and a second component that implements a second function of the control policy, and wherein the first function of the control policy defines a first portion of a functionality provided by a cloud control and the second function of the control policy defines a second portion of the functionality provided by the cloud control;

delegate control of the first component to a user device, wherein the control of the first component includes a privilege for modifying the first component;

receive, from the user device, an update to the first component, wherein the update includes a modification to the first component;

update a workflow state associated with the first component responsive to receiving the update to the first component;

receive, from a second user device, a second update to the second component, wherein the second update includes a modification to the second component;

update a second workflow state associated with the second component responsive to receiving the second update to the second component;

update a lifecycle state associated with the control policy responsive to the modification to the first component and the modification to the second component; and deploy the cloud control based on the lifecycle state associated with the control policy.

8. The cloud controls implementation system of claim 7, wherein the cloud control enforces a security requirement on a resource in a cloud network and the functionality provided by the cloud control comprises a security action associated with the resource in the cloud network.

9. The cloud controls implementation system of claim 7, wherein the privilege includes one of an authoring privilege for authoring the first component, a review privilege for reviewing the first component, or an approval privilege for approving the first component.

10. The cloud controls implementation system of claim 9, wherein the workflow state and the second workflow state comprise a plurality of states associated with implementing the first component in the control policy including a first state indicating that the first component is being authored, a second state indicating the first component is undergoing review, or a third state indicating that the first component is ready to be implemented in the control policy.

11. The cloud controls implementation system of claim 9, wherein updating the lifecycle state associated with the control policy is based on the workflow state associated with the first component and the second workflow state associated with the second component.

12. The cloud controls implementation system of claim 9, wherein the processor is further configured to:

delegate control of the second component to a second user device, wherein the control of the second component includes a second privilege for modifying the second component.

13. A non-transitory computer-readable medium storing instructions, the instructions, when executed by a processor in a cloud controls implementation system of a cloud network, cause the processor to perform operations comprising:

associating a plurality of components with a control policy, wherein the plurality of components includes a component that is configured to implement a function of the control policy and a second component that implements a second function of the control policy, and wherein the function of the control policy defines a first portion of a functionality provided by the cloud control and the second function of the control policy defines a second portion of the functionality provided by the cloud control;

delegating control of the first component to a user device, wherein the control of the first component includes a privilege for modifying the first component;

receiving, from the user device, an update to the first component, wherein the update includes a modification to the first component;

updating a workflow state associated with the first component responsive to receiving the update to the first component;

receiving, from a second user device, a second update to the second component, wherein the second update includes a modification to the second component;

updating a second workflow state associated with the second component responsive to receiving the second update to the second component;

updating a lifecycle state associated with the control policy responsive to the modification to the first component and the modification to the second component; and deploying the cloud control based on the lifecycle state associated with the control policy.

14. The non-transitory computer-readable medium of claim 13, wherein the cloud control enforces a security requirement on a resource in the cloud network and the functionality provided by the cloud control comprises a security action associated with the resource in the cloud network.

15. The non-transitory computer-readable medium of claim 13, wherein the privilege includes one of an authoring privilege for authoring the first component, a review privilege for reviewing the component, or an approval privilege for approving the first component.

* * * * *